(12) United States Patent
Yuan et al.

(10) Patent No.: US 11,088,965 B2
(45) Date of Patent: Aug. 10, 2021

(54) SDN-BASED PACKET MIRRORING METHOD, AND NETWORK TRAFFIC MONITORING AND MANAGEMENT SYSTEM

(71) Applicant: CHINA UNIONPAY CO., LTD., Shanghai (CN)

(72) Inventors: Hang Yuan, Shanghai (CN); Yongkai Zhou, Shanghai (CN); Lijun Zu, Shanghai (CN); Huajun Chen, Shanghai (CN); Junling Yan, Shanghai (CN); Guobao Liu, Shanghai (CN); Shuo He, Shanghai (CN)

(73) Assignee: CHINA UNIONPAY CO., LTD., Shanghai (CN)

(*) Notice: Subject to any disclaimer, the term of this patent is extended or adjusted under 35 U.S.C. 154(b) by 32 days.

(21) Appl. No.: 16/474,970

(22) PCT Filed: Dec. 21, 2017

(86) PCT No.: PCT/CN2017/117776
§ 371 (c)(1),
(2) Date: Jun. 28, 2019

(87) PCT Pub. No.: WO2018/121406
PCT Pub. Date: Jul. 5, 2018

(65) Prior Publication Data
US 2019/0349316 A1    Nov. 14, 2019

(30) Foreign Application Priority Data
Dec. 29, 2016  (CN) .......................... 201611242762.8

(51) Int. Cl.
*H04L 12/931* (2013.01)
*H04L 29/08* (2006.01)

(52) U.S. Cl.
CPC ........ *H04L 49/208* (2013.01); *H04L 67/1095* (2013.01)

(58) Field of Classification Search
CPC .......................... H04L 49/208; H04L 67/1095
(Continued)

(56) References Cited

U.S. PATENT DOCUMENTS 9,038,151 B1 * 5/2015 Chua ...................... H04L 45/28
726/6
2013/0088967 A1 * 4/2013 Kusumoto .............. H04L 47/11
370/235

(Continued)

FOREIGN PATENT DOCUMENTS

CN      103684922 A    3/2014
CN      103973481 A    8/2014

(Continued)

*Primary Examiner* — Tauqir Hussain
(74) *Attorney, Agent, or Firm* — The Ollila Law Group LLC

(57) ABSTRACT

The present disclosure relates to a SDN-based method for mirroring packets, wherein a SDN controller is coupled to an upper layer application and at least one data switching exchange respectively, and the method including: a) the upper layer application sends a mirroring instruction to the SDN controller through a first northbound interface of the SDN controller; b) the SDN controller generates a second flow table based on the mirroring instruction and a first flow table sent by a first data switching exchange; wherein the first data switching exchange initiates transmission of the packets, the first flow table encapsulates the packets, and the second flow table includes at least an action command corresponding to the mirroring instruction; and c) a second data switching exchange extracts the packets from the second flow table, and mirrors the packets to the designated node based on the action command.

5 Claims, 2 Drawing Sheets

(58) Field of Classification Search
USPC .......................................................... 709/223
See application file for complete search history.

(56) References Cited

U.S. PATENT DOCUMENTS

| | | |
|---|---|---|
| 2014/0328180 A1 | 11/2014 | Kim et al. |
| 2015/0142936 A1* | 5/2015 | Srinivas .................. H04L 43/04 709/221 |
| 2015/0319070 A1* | 11/2015 | Nachum ............. H04L 12/4633 370/400 |
| 2016/0142936 A1* | 5/2016 | Bressanelli ......... H04L 12/6418 370/242 |
| 2016/0269482 A1* | 9/2016 | Jamjoom ................ H04L 45/64 |
| 2017/0026226 A1* | 1/2017 | Grussling .................. H04L 9/08 |
| 2017/0048312 A1* | 2/2017 | Moyer .................... H04L 43/12 |
| 2017/0171310 A1* | 6/2017 | Gardner ............. H04L 67/2852 |
| 2018/0097723 A1* | 4/2018 | Chinthalapati ......... H04L 45/38 |

FOREIGN PATENT DOCUMENTS

| | | |
|---|---|---|
| CN | 104168144 A | 11/2014 |
| CN | 104601432 A | 5/2015 |
| CN | 104618194 A | 5/2015 |
| CN | 105306622 A | 2/2016 |
| CN | 105357075 A | 2/2016 |
| CN | 105743734 A | 11/2016 |
| CN | 106101011 A | 11/2016 |

\* cited by examiner

SDN-BASED PACKET MIRRORING METHOD, AND NETWORK TRAFFIC MONITORING AND MANAGEMENT SYSTEM

This application claims the benefits of Chinese Patent Application No. 201611242762.8, filed with the Chinese Patent Office on Dec. 29, 2016, and entitled "SDN-BASED PACKET MIRRORING METHOD, AND NETWORK TRAFFIC MONITORING AND MANAGEMENT SYSTEM", which is hereby incorporated by reference in its entirety.

FIELD DISCLOSURE

The present disclosure relates to the technical field of network traffic monitoring, and more specifically, to a SDN-based method for mirroring packets.

BACKGROUND

Software Defined Network (SDN) is a new type of network innovation architecture for networks, and is an implementation means for network virtualization, the core of which is to separate the control aspect of a network device from the data aspect to achieve flexible control of network traffic, thereby making the network to be more intelligent as a pipeline.

Port mirroring technology is used to forward data traffic of one or more source ports to a designated port by configuring a switching exchange or a router so as to realize monitoring of the network. The designated port is referred to as a "mirroring port" or a "destination port". Port mirroring does not affect the packets exchange between the source port and the destination port. It only copies all the packets that are sent to and from the source port to the destination port, and monitors and analyzes the traffic of the network through the mirroring port. By using the mirroring function in an enterprise, the network data inside the enterprise can be well monitored and managed. In case the network fails, the fault can be quickly located.

The existing port mirroring technology has some drawbacks. On the one hand, the existing technology normally configures the relevant parameters of the switching exchanges in a manual way so as to mirror the ports or the packets. The method has a low level of automation, and cannot control the mirroring port in a flexible way. Besides, misoperations would possibly occur, increasing the risk of frequent servicing and maintenance.

On the other hand, the current traffic mirroring is performed for a certain port, and all traffic passing through the port is mirrored to the monitoring system. However, many packets in the traffic are not necessary for the monitoring system. Therefore, the traffic must be further matched and filtered such that the truly necessary packet data can be obtained. Especially in the current cloud computing environment, one switching exchange port will carry the communication traffic of many virtual machines, but the monitoring system may only need the traffic related to one virtual machine or even only one application. If all the traffic passing through the port is mirrored, it will not only increase the burden on the network, affect the stability of the network, but also impose significant pressure on the monitoring server.

SUMMARY OF THE DISCLOSURE

Embodiment of present disclosure provides a technical solution as follows:

A SDN-based method for mirroring packets, wherein a SDN controller is coupled to an upper layer application and at least one data switching exchange respectively, and the method includes the following steps: a) the upper layer application sends a mirroring instruction to the SDN controller through a first northbound interface of the SDN controller; b) the SDN controller generates a second flow table based on the mirroring instruction and a first flow table sent by a first data switching exchange; wherein, the first data switching exchange initiates transmission of the packets, the first flow table encapsulates the packets, and the second flow table includes at least an action command corresponding to the mirroring instruction; and c) a second data switching exchange extracts the packets from the second flow table, and mirrors the packets to the designated node based on the action command.

In an embodiment of the present disclosure provides a system for monitoring and managing network traffic, coupled to at least a first and second data switching exchanges respectively, the system comprising: an upper layer application control unit that sends a mirroring instruction to a SDN controller through a first northbound interface of the SDN controller; the SDN controller generates a second flow table based on the mirroring instruction and a first flow table sent by the first data switching exchange; wherein, the first data switching exchange initiates transmission of the packets, the first flow table encapsulates the packets, the second flow table includes at least an action command corresponding to the mirroring instruction, and the second data switching exchange extracts the packets from the second flow table, and mirrors the packets to the designated node based on the action command; and a monitoring and management unit that monitors and manages the network traffic according to the packets received by the designated node.

The packet mirroring method provided by the embodiments of the present disclosure does not need to configure the data switching exchanges in a manual way, instead, the SDN controller implements controlling of the data switching exchanges. In terms of network traffic monitoring, the method is focused on the packets corresponding to a specific port, a virtual machine or even a specific application, while excluding the packets that does not need to be monitored.

DETAILED DESCRIPTION OF THE EMBODIMENTS

For convenience of explanation, in various embodiments of the present disclosure, a SDN controller and a first and second data switching exchanges are exemplarily illustrated. The SDN controller is communicatively coupled to the first and second data switching exchanges, respectively. However, it can be understood that, according to particular application scenarios, the present disclosure can be implemented in a case where a plurality of SDN controllers and more data switching exchanges are included, as long as the plurality of SDN controllers and the more data switching exchanges are coupled to each other, and are communicated in accordance with an agreed protocol.

A SDN northbound interface is an interface that the SDN controller opens to the upper layer service application, with a purpose of enabling the service application to conveniently call the underlying network resources and capabilities. Through the northbound interface, developers of network services can call various network resources by means of software programming.

A SDN southbound interface is an interface that the SDN controller opens to the underlying switching device. On the one hand, the information reported by the underlying switching device is monitored and collected by an uplink channel. On the other hand, the SDN controller also utilizes the downlink channel of the southbound interface to control downstream network devices.

Figure 1:
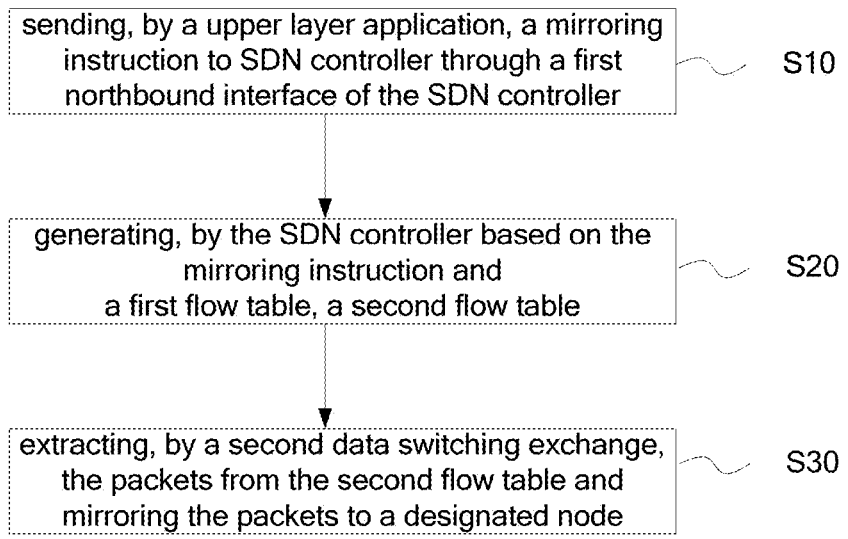
FIG. 1 is a flowchart of a SDN-based method for mirroring packets according to a first embodiment of the present disclosure.

As shown in FIG. 1, a first embodiment of the present disclosure provides a SDN-based method for mirroring packets, which includes the following steps.

Step S10: The upper layer application sends a mirroring instruction to the SDN controller through the first northbound interface of the SDN controller.

Specifically, the SDN controller provides encapsulated northbound interfaces for the upper layer application. By calling these northbound interfaces, the upper layer application can implement functions such as calling, allocating, and releasing network resources. The call of the northbound interface affects the SDN controller to deliver the corresponding control policy to the data switching exchange through the southbound interface protocol.

According to the step S10, the first northbound interface is programmed by the user.

Step S20: The SDN controller generates a second flow table based on the mirroring instruction and a first flow table sent by the first data switching exchange.

Herein, the first data switching exchange initiates transmission of the packets, the first flow table encapsulates the packets, and the second flow table includes at least an action command corresponding to the mirroring instruction. The action command instructs the switching exchange that receives the second flow table how to perform packet mirroring, as described below.

According to a preferred embodiment, the first and second flow tables adopt an OpenFlow protocol. Specifically, the packet structure of the OpenFlow protocol (hereinafter referred to as a flow table) is shown in FIG. 3.

Figure 3:
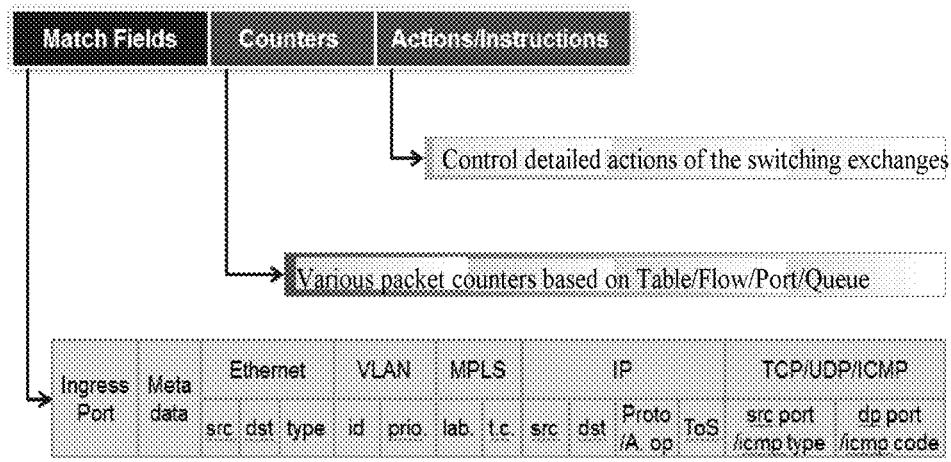
FIG. 3 is a table illustrating the packet structure of an OpenFlow protocol.

As shown in FIG. 3, the OpenFlow protocol includes:

Match Fields: match the data packets, and execute the actions in the flow table after the matching is completed;

Counter: not discussed in the description;

Actions: Action sets, including at least one action command for controlling the actions of the data switching exchanges, such as encapsulation/decompression, multipath forwarding, outputting toward one or more ports, and so on.

Regarding the generation of the second flow table, as an example, in the action set of the flow table, a command to output data to the designated port "output" may be added after the normal forwarding action. For example, if the data is forwarded to port 1 (the port connected to the application) and port 5 (the port connected to the control system), the action command "output 1 5" can be added; in other words, the second flow table will include the action command corresponding to the mirroring instruction.

Step S30: The second data switching exchange extracts the packets from the second flow table, and mirrors the packets to the designated node based on the action command Continuing with the above example, after parsing the second flow table, the data switching exchange that receives the second flow table obtains the action command "output 1 5". Per the action command, the second data switching exchange will mirror the packets to port 5.

Further, the monitoring system monitors and manages network traffic according to each packet received by the designated node. Such monitoring and management are performed on the basis of a packet unit. Herein the packet can correspond to a specific port, a virtual machine, or even a specific application. The packet which does not need to be monitored can be excluded. The present disclosure can thus implement traffic monitoring with a finer granularity.

Figure 2:
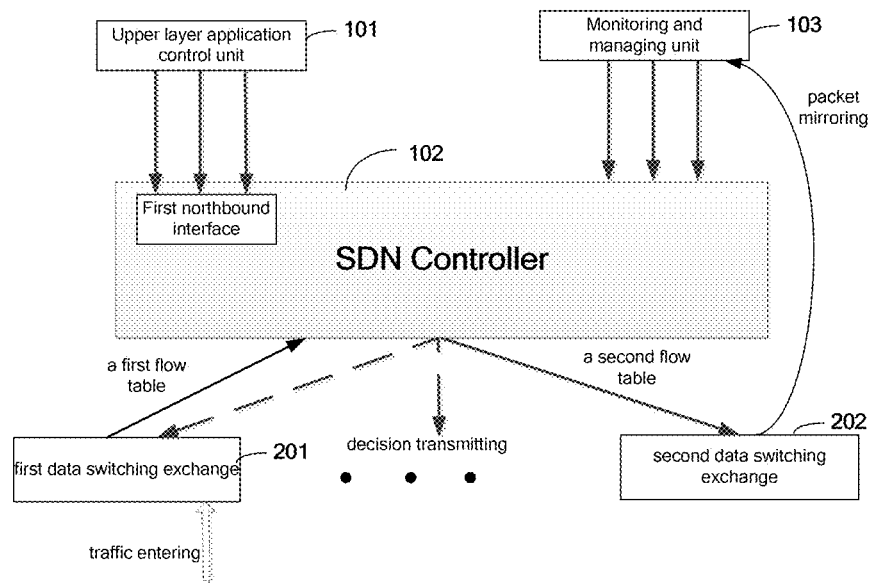
FIG. 2 is a block diagram showing the structure of a system for monitoring and managing network traffic according to a second embodiment of the present disclosure.

As shown in FIG. 2, a second embodiment of the present disclosure provides a system for monitoring and managing network traffic. The system includes at least an upper layer application control unit 101, a SDN controller 102, and a monitoring and management unit 103. The system for monitoring and managing network traffic is communicatively coupled to a first and second data switching exchanges 201, 202 via the SDN controller 102, respectively. The first data switching exchange 201 initiates transmission of the packets, the second data switching exchange 202 expects to obtain the packets, and the monitoring and management unit 103 expects to obtain the packet mirroring so as to monitor the network traffic.

Specifically, the upper layer application control unit 101 transmits a mirroring instruction to the SDN controller 102 through the first northbound interface of the SDN controller 102.

The SDN controller 102 generates a second flow table based on the mirroring instruction and a first flow table sent by the first data switching exchange 201; the first flow table encapsulates the packets to be transmitted, and the second flow table includes at least an action command corresponding to the mirroring instruction.

Upon receipt of the second flow table, the second data switching exchange 202 extracts the packets from the second flow table, and mirrors the packets to the designated node based on the action command.

Finally, the monitoring and management unit 103 monitors and manages the network traffic according to the packets received by the designated node.

As an improved embodiment, the SDN controller 102 can issue control policies to the first and second data switching exchanges 201, 202 to instruct the data switching exchanges 201, 202 to perform other actions in addition to the mirroring action.

According to a preferred embodiment, the system for monitoring and managing network traffic can be deployed as a distributed system, for example, the upper layer application control unit and the SDN controller are disposed at a local end, and the monitoring and management unit is disposed at a remote end. The first and second data switching exchanges 201, 202 can also be disposed at another remote end.

Further, the network traffic monitoring and management system can also be deployed in a cloud computing manner.

The above depictions are only for the preferred embodiments of the present disclosure and are not intended to limit the scope of protection of the present disclosure. Various modifications may be made by those skilled in the art without departing from the spirit of the disclosure and the appended claims.

The invention claimed is:

1. A SDN-based method for mirroring packets and a SDN controller is coupled to an upper layer application and at least one data switching exchange respectively, the method comprising:
   a) sending, by the upper layer application, a mirroring instruction to the SDN controller through a first northbound interface of the SDN controller;
   b) generating, by the SDN controller based on the mirroring instruction and a first flow table sent by a first data switching exchange, a second flow table; wherein the first data switching exchange is configured to initiate transmission of the packets, the first flow table encapsulates the packets, and the second flow table includes at least an action command corresponding to the mirroring instruction;
   c) extracting, by a second data switching exchange, the packets from the second flow table, and mirroring the packets to a designated node based on the action command;
   wherein the first and second flow tables adopt an OpenFlow protocol; and
   wherein each of the first and second flow tables includes at least a match field item and an action set item, wherein the match field item is used to match the packets, and the action set item includes at least one action command for controlling the actions of the data switching exchanges.

2. The method of claim 1, wherein the first northbound interface is programmed by the user.

3. The method of claim 1, further comprising: monitoring and managing, by a monitoring system according to the packets received by the designated node, network traffic.

4. A system for monitoring and managing network traffic, coupled to at least a first data switching exchange and a second data switching exchange respectively, the system comprising:
   an upper layer application control unit, configured to send a mirroring instruction to a SDN controller through a first northbound interface of the SDN controller;
   the SDN controller, configured to generate a second flow table based on the mirroring instruction and a first flow table sent by the first data switching exchange; wherein the first data switching exchange is configured to initiate transmission of the packets, the first flow table encapsulates the packets, the second flow table includes at least an action command corresponding to the mirroring instruction, and wherein the second data switching exchange is configured to extract the packets from the second flow table and mirror the packets to a designated node based on the action command;
   wherein the first and second flow tables adopt an OpenFlow protocol;
   wherein each of the first and second flow tables includes at least a match field item and an action set item, wherein the match field item is used to match the packets, and the action set item includes at least one action command for controlling the actions of the data switching exchanges and
   a monitoring and management unit, configured to monitor and manage the network traffic according to the packets received by the designated node.

5. The system according to claim 4, wherein the system is deployed as a distributed system.

* * * * *